(12) United States Patent
Sun et al.

(10) Patent No.: US 8,631,053 B2
(45) Date of Patent: Jan. 14, 2014

(54) METHOD FOR SECURELY DETERMINING MANHATTAN DISTANCES

(75) Inventors: Wei Sun, Waterloo (CA); Shantanu D. Rane, Cambridge, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1171 days.

(21) Appl. No.: 12/551,354

(22) Filed: Aug. 31, 2009

(65) Prior Publication Data

US 2011/0055300 A1   Mar. 3, 2011

(51) Int. Cl.
*G06F 7/00* (2006.01)
*G06F 15/00* (2006.01)

(52) U.S. Cl.
USPC .......................................................... 708/200

(58) Field of Classification Search
None
See application file for complete search history.

(56) References Cited

U.S. PATENT DOCUMENTS

| | | | | |
|---|---|---|---|---|
| 5,530,393 A | * | 6/1996 | Guerrieri et al. | 327/355 |
| 5,892,775 A | * | 4/1999 | Jayant et al. | 714/701 |
| 6,298,322 B1 | * | 10/2001 | Lindemann | 704/222 |
| 6,614,861 B1 | * | 9/2003 | Terry et al. | 375/347 |
| 6,691,145 B1 | * | 2/2004 | Shibata et al. | 708/801 |
| 2002/0150241 A1 | * | 10/2002 | Scheidt et al. | 380/44 |
| 2010/0329448 A1 | * | 12/2010 | Rane et al. | 380/28 |
| 2011/0194737 A1 | * | 8/2011 | Sharma et al. | 382/112 |

* cited by examiner

*Primary Examiner* — Henry Tsai
*Assistant Examiner* — Aurangzeb Hassan
(74) *Attorney, Agent, or Firm* — Dirk Brinkman; Gene Vinokur

(57) ABSTRACT

Embodiments disclose a method and a system for determining securely the Manhattan distance between a first and a second signal. The system is mapping the first signal to a first binary signal; mapping the second signal to a second binary signal, such that the squared distance between the first signal and the second binary signals equals the Manhattan distance; reducing respectively dimensions of the first binary signal and the second binary signal to produce a first low dimensional signal and a second low dimensional signal, such that the squared distance between the first low dimensional signal and the second low dimensional signals approximates the squared distance between the first binary signal and the second binary signals; and determining securely the squared distance between the first low dimensional signal and the second low dimensional signals to securely determine the Manhattan distance between the first signal and the second signal.

17 Claims, 3 Drawing Sheets

100

200

METHOD FOR SECURELY DETERMINING MANHATTAN DISTANCES

FIELD OF THE INVENTION

This invention relates generally to determining a difference between signals, and more particularly to determining a difference between two encrypted signals.

BACKGROUND OF THE INVENTION

It is often required to determine securely a difference measure between two signals. Conventional methods typically use cryptographic hash functions to determine whether two signals are different. If the hashes of signals x and y are equal, then the signal x equals to the signal y, assuming that hash collisions occur with a negligibly low probability. That comparison of cryptographic hashes is fundamental in most password and key management applications.

An essential property of conventional cryptographic hash functions is that the hashes do not preserve the underlying structure of the signals that are compared. Specifically, if one signal is a noisy version of another signal, the cryptographic hashes of the two signals are different, even if the noise is small. Therefore, a cryptographic hash cannot, by itself, be used for comparing the signals in noisy environments, e.g., storage devices and communication channels.

Determining the difference between signals in a secure manner is important in many applications. For example, private medical data are to be analyzed and classified by a third party, without revealing the medical data to the third party. In addition, the third party does not want to reveal the classification method, nor the database used for the classification.

This problem is often defined as a secure multiparty computation (SMC). Computationally secure methods, such as oblivious transfer (OT), secure inner product (SIP) can be used as primitives to perform more complicated operations, thereby enabling SMC, see for example U.S. patent application Ser. No. 11/005,293 describes such a method. That method performs object detection without revealing the image supplied by a user, or the classification method used by classifier. However, the method requires a large number of exchanges between the user and the classifier. The overhead, in terms of exchanges and key management, is very large.

The differences between signals are determined according to distance metrics. Examples of the distance metrics are squared distance, Hamming distance, and Manhattan distance. There are number of methods in the art for determining securely the squared distance and the Hamming distance between the signals. See, for example, U.S. patent application Ser. No. 12/495,721 filed by Rane et al. on Jun. 30, 2009, and incorporated herein by reference. However, there is no two-party method in the art for determining securely the Manhattan distance between two signals, while having low communication overhead. As defined herein, "securely" means that each party, e.g., a processor, keeps its signal secret from the other party throughout the computation.

The Manhattan distance between two points is the sum of the absolute differences of their coordinates. Manhattan distance is also referred to as the L1 distance, taxicab distance, city block distance and rectilinear distance.

In case of signals, the Manhattan distance between signals of dimension n, $x=(x_1, x_2, \ldots, x_n)$ and $y=(y_1, y_2, \ldots, y_n)$ is $$\|x-y\|_1 = \sum_{i=1}^{n} |x_i - y_i|,$$

where x and y are signals and normal $x_i$ and $y_i$ are the individual components of signals x and y.

There are a number of methods in the art for approximation of the Manhattan distances in different metric spaces. However, all those methods are not secure by design, and require a significant communication overhead between parties. Hence, it is desired to determine the Manhattan distance between two signals securely.

Similarly, the squared distance between two points is the sum of the squared differences of their coordinates. Thus, the squared distance between signals of dimension n, $x=(x_1, x_2, \ldots, x_n)$ and $y=(y_1, y_2, \ldots, y_n)$ is $$(\|x-y\|_2)^2 = \sum_{i=1}^{n} (x_i - y_i)^2.$$

SUMMARY OF THE INVENTION

Embodiments of the invention are based on the realization that signals x and y can be mapped to corresponding binary signals $\tilde{x}$ and $\tilde{y}$, such that squared distance between the binary signals equals the Manhattan distance between the signals. Accordingly, the Manhattan distance between the signals can be determined securely, by determining securely the squared distance between the binary signals using any method known in the art. Furthermore, the length of the binary signals, and accordingly the overhead of communication, can be reduced while preserving the squared distance between the binary signals.

One embodiment discloses a method for determining securely a Manhattan distance between a first and a second signal. The method maps the first signal to a first binary signal and the second signal to a second binary signal, such that squared distance between the first binary signal and the second binary signals equals a Manhattan distance. Next, the method reduces respectively dimensions of the first binary signal and the second binary signal to produce a first low dimensional signal and a second low dimensional signal, such that squared distance between the first low dimensional signal and the second low dimensional signals approximates squared distance between the first binary signal and the second binary signals. And finally, the method determines squared distance between the first low dimensional signal and the second low dimensional signals to securely determine the Manhattan distance between the first signal and the second signal. The securely determine the Manhattan distance means that if two different parties has the signals x and y then the distance calculation can be carried out without sharing x and y. In other words, each party maintains the secrecy of party's input signal throughout the computation.

In an alternative embodiment, we map the first signal and the second signal to the first and the second binary signals, and securely determine the Manhattan distance by securely determining the squared distance between the first and the second binary signals. In this embodiment, the dimensionality-reduction step is skipped. In this embodiment the communication overhead is not a concern.

Another embodiment discloses a system for determining securely a Manhattan distance between a first signal and a second signal, comprising a first processor and a second processor for performing steps of the method such that the first signal is kept secret from the second processor, and the second signal is kept secret from the first processor, wherein a first signal is mapped to a first binary signal, and the first binary signal is further reduced in dimension producing a first low dimensional signal. The system includes means for mapping the second signal to a second binary signal, wherein the squared distance between the first signal and the second binary signals equals a Manhattan distance; means for reducing dimensions of the second binary signal to produce a second low dimensional signal, such that squared distance between the first low dimensional signal and the second low dimensional signals approximates squared distance between the first binary signal and the second binary signals; and means for determining securely squared distance between the first low dimensional signal and the second low dimensional signals to securely determine the Manhattan distance between the first signal and the second signal.

DETAILED DESCRIPTION OF THE PREFERRED EMBODIMENT

Embodiments of the invention are based on the realization that signals x and y can be mapped to corresponding binary signals $\tilde{x}$ and $\tilde{y}$, such that the squared distance between the binary signals equals the Manhattan distance between the signals. Accordingly, the Manhattan distance between the signals can be determined securely, by determining securely the squared distance between the binary signals using any method known in the art. Furthermore, the length of the binary signals, and accordingly the overhead of communication, can be reduced while approximately preserving the squared distance between the binary signals, and hence the Manhattan distance between the original signals x and y.

The term "signals" is used broadly in this specification and appended claims. For example, the signals can be data vectors, matrices, images, biological data, electromagnetic signals, etc.

Figure 1:
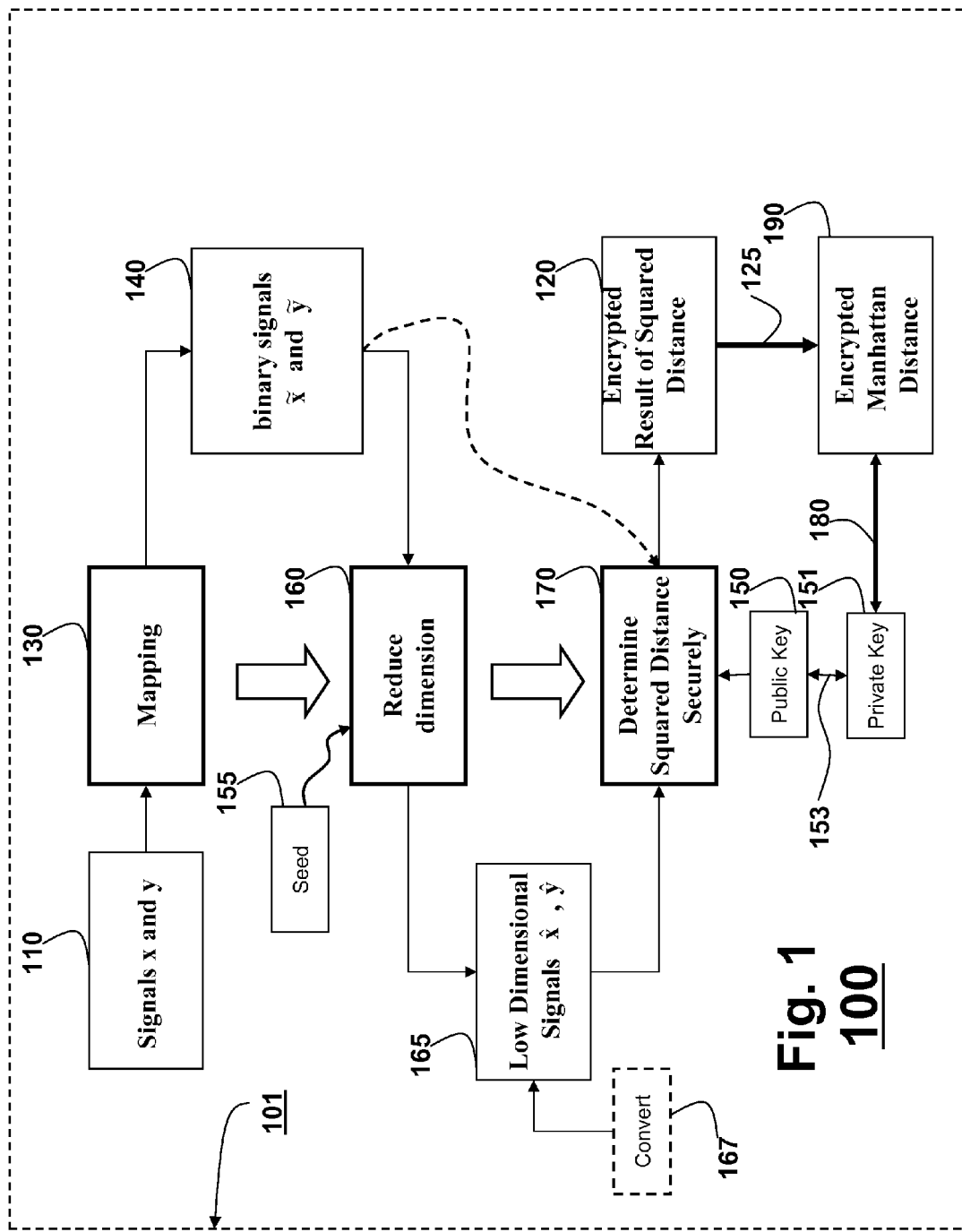
FIGS. 1 and 2 are diagrams of a method for securely determining an encrypted Manhattan distance between the signals.

FIG. 1 shows a system and a method 100 for determining securely an encrypted Manhattan distance 190 between the two signals 110. The Manhattan distance 190 equals an encrypted result 120 of squared distance function applied to binary signals 140, or to low dimensional signals 165, according to various embodiments of the invention.

The result 120 is encrypted with a public key 150. In one embodiment, the encrypted result is securely communicated 125 and decrypted 180 with a private key 151 associated 153 with the public key 150. In some embodiments, the system includes one or more processors to perform the steps of the method, e.g., a first processor 101.

The signals x and y are mapped 130 into the binary signals $\tilde{x}$ and $\tilde{y}$ 140, such that the squared distance between the binary signals 140 is equal to the Manhattan distance between the signals 110, as described in greater details below. Accordingly, $$(\|\tilde{x}-\tilde{y}\|_2)^2 = \|x-y\|_1,$$

wherein subscript $_2$ represents squared distance, and the subscript $_1$ represents the Manhattan distance.

In one embodiment, we determine 170 the squared distance of the binary signals using conventional methods for determining securely squared distance between two signals, as described below. Typically, the binary signals 140 have a much larger dimension than the signals 110, which, owing to the use of encryption in the protocol, increases the communication overhead during the determining step 170.

To resolve this problem, in one embodiment, we produce 160 a low dimensional signals $\hat{x}$ and $\hat{y}$ 165, such that the squared distance between the binary signals approximately equals the squared distance between the two low dimensional signals. Accordingly, $$(\|\tilde{x}-\tilde{y}\|_2)^2 \approx (\|\hat{x}-\hat{y}\|_2)^2$$

Hence, the task of computing the Manhattan distance 190 is reduced to secure computation 170 of the squared distance 120 between the low dimensional signals 165, which usually have only slightly larger dimension than the signals 110.

Mapping the Signals

In one embodiment, the signals 110 are two integer sequences of dimension n, $x=(x_1, x_2, \ldots, x_n)$ and $y=(y_1, y_2, \ldots, y_n)$, where $x_i, y_i \in \{0, 1, \ldots, M-1\}$ for all $i \in \{1, 2 \ldots n\}$, and where a M is the maximum value of each element of the signals. In one embodiment, value M is a positive integer. In another embodiment, the value M is quantized to the next higher integer, i.e., approximating a mapping If some or all elements of the signals x and y have negative value, then an appropriate constant integer is added to each element of the signals x and y to ensure that all elements have a non-negative value.

We define a binary transformation function $$f:\{0,1,\ldots,M-1\} \to \{0,1\}^{M-1}$$

such that $f(u)$ is a binary signal containing 1's as the first u entries and 0's as the following M−1−u entries. For example, if the signal x has two elements $\{1, 3\}$, and M is 5, then the binary signal $\|(u)$ is $\{10000, 11100\}$.

Thus, in one embodiment we map the signals 110 to the binary signals according to a binary transformation function:

$$\tilde{x}=(f(x_1),f(x_2),\ldots,f(x_n)) \text{ and } \tilde{Y}=(f(y_1),f(y_2),\ldots,f(y_n)).$$

The squared distance between the binary signals equals the Manhattan distance between the binary signals, and, importantly, equals the Manhattan distance between the two signals. Hence, $$\|x-y\|_1 = \|\tilde{x}-\tilde{y}\|_1 = (\|\tilde{x}-\tilde{y}\|_2)^2 \qquad (1)$$

The binary signals $\tilde{x}$ and $\tilde{y}$ have a dimension $n(M-1)$. For example, if the maximum value M is 255, then the dimension of the binary signals is 254 times greater than the dimensions of the signals, which leads to high communication overhead during determining securely the squared distance between the binary signals. Thus, it is desired to reduce the dimensions of the binary signals while preserving, at least with some approximation, the squared distance between the binary signals.

Reducing Dimension of the Signals

In some embodiments, we reduce 160 the dimensions of the binary signals $\tilde{x}$ and $\tilde{y}$ to produce low dimensional signals, such that the squared distance $l_2$ between the binary signals and the low dimensional signals is approximately preserved.

In one embodiment, we convert the binary signals to low dimensional signals using an embedding function defined according to a lemma of Johnson-Lindenstrauss (JL), which embeds high-dimensional data into a low-dimensional space.

Lemma 1

Given a parameter $\epsilon > 0$ and an integer s, let k be a positive integer such that $k \geq k_0 = O(\epsilon^{-2} \log s)$ For every set P of s points in the space $R^d$ there exists an embedding function $g:R^d \to R^k$, such that for all u, $v \in P$ $$(1-\epsilon)\|u-v\|_2^2 \leq \|g(u)-g(v)\|_2^2 \leq (1+\epsilon)\|u-v\|_2^2. \qquad (2)$$

Thus, using the embedding function g, the squared distance $l_2$ between any two points u, v in a high dimension is approximately equal to the squared distance $l_2$ between g(u), g(v) in the lower dimension.

In one embodiment, we set s=M'' in the Lemma 1 to determine the number of reduced dimensions. Then, for parameters $\epsilon, \beta > 0$, we set $$k = \frac{(4+2\beta)n}{\epsilon^2/2 - \epsilon^3/3} \log M. \quad (3)$$

In another embodiment, we set k=αn log M to simplify Equation (3), where the constant α represents a function of both parameters $\epsilon$ and $\beta$, in addition to the change in the base of the logarithm. Here, $\epsilon$ and $\beta$ are the approximation parameter and error probability parameter for randomly chosen embedding function g stated specifically below.

In one embodiment, we randomly choose the JL embedding function $g: R^{n(M-1)} \to R^k$ as follows. Define $$\hat{x} = g(\tilde{x}) = \frac{1}{\sqrt{k}} R\tilde{x},$$

$$\text{similarly, } \hat{y} = g(\tilde{y}) = \frac{1}{\sqrt{k}} R\tilde{y}$$

where the entries of the n(M−1)×k matrix R are independent and identically distributed (i.i.d.) Bernoulli numbers, wherein each bit is +1 or −1 with equal probability b, i.e., b=0.5. The probability of the event that (2) is false is at most $S^{-\beta}$. A seed 155 used to generate the entries of the matrix R is shared between processors.

The signals $\hat{x}$ $\hat{y}$ have dimension k. Thus, according to the Lemma 1 and Equation (3):

$$\|x-y\|_1 = (\|\tilde{x}-\tilde{y}\|_2)^2 \approx (\|\hat{x}-\hat{y}\|_2)^2 \quad (4)$$

Typically, the low dimensional signals $\hat{x}$ and $\hat{y}$ are not integer signals. In several embodiments, we convert 167 values of the low dimensional signals 165 to integer values before determining 170 the squared distance between the signals 165. For example, in one embodiment, we multiply the values of each element of the signals 165 by $\sqrt{k}$, which ensures that the signals are integers, according to the JL embedding function above. Then, after determining the encrypted result 120, we divide the encrypted result by $\sqrt{k}$. In another embodiment, we quantize the value of each element of the signals 165 to a nearest integer.

Secure Computation of Squared Distance

Embodiments of the invention use different methods for determining securely the squared distance between the signals 165 or the signals 140. In one embodiment, we express the squared distance function as a linear combination of homomorphic components to determine the squared distance based on homomorphic transformation, as described in the U.S. application Ser. No. 12/495,721, incorporated herein by reference. The homomorphic component is an algebraic combination of the signals 165, such that the encrypted result of the algebraic combination is suitable to be determined directly from encrypted versions of the signals 165 using homomorphic properties. The signals 165 are encrypted with a public key 150.

Thus, we determine the encrypted results of the homomorphic components from the encrypted versions of the signals 165 and combine the encrypted results of the homomorphic components according to the linear combination to produce the encrypted result 120.

Example

Figure 2:
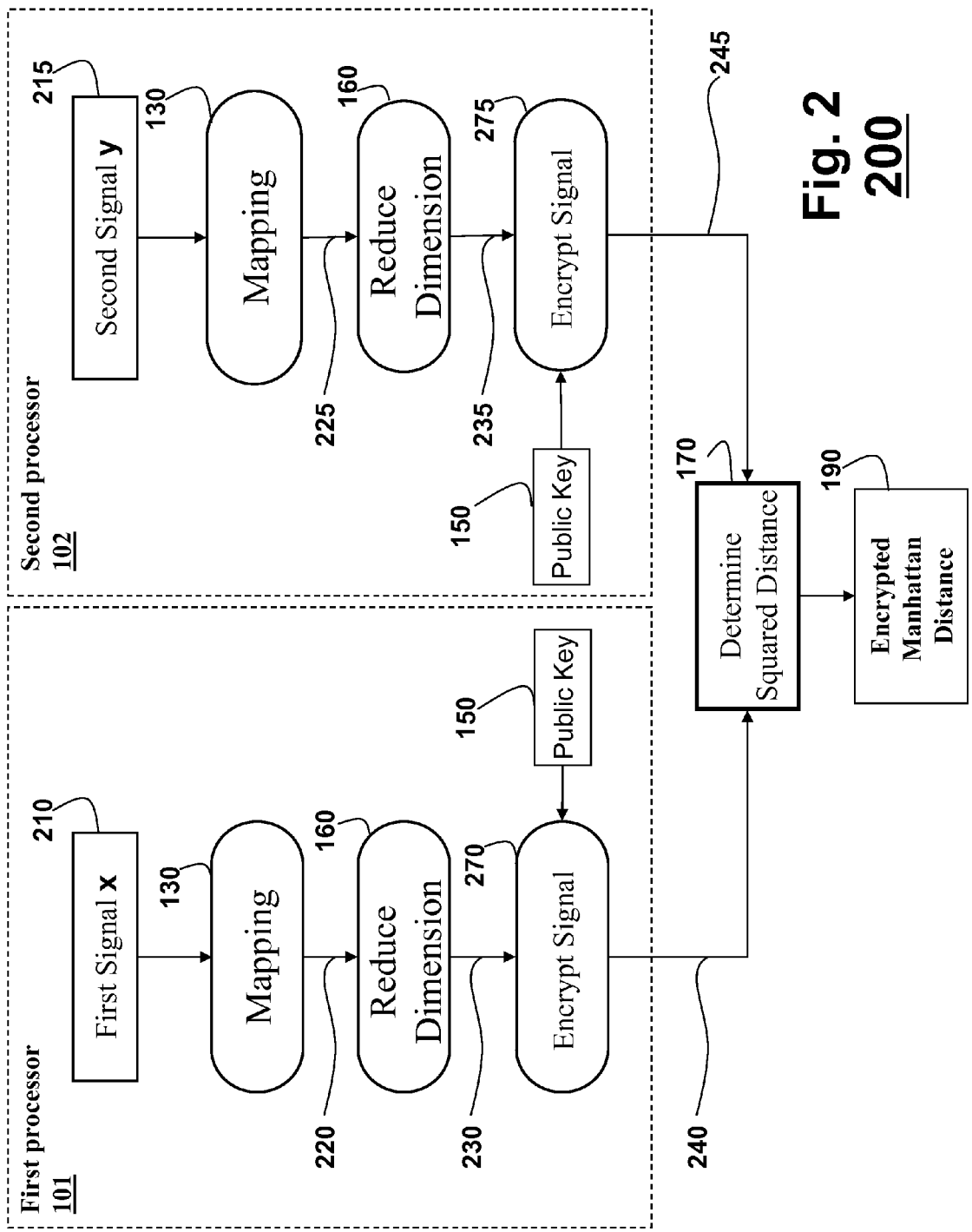

FIG. 2 shows a method 200 for determining the encrypted Manhattan distance 190 between a first signal 210 stored on a first processor 101 and a second signal 215 stored on a second processor 102. The method is executed by the first processor and the second processor such that the first signal is kept secret from the second processor, and the second signal is kept secret from the first processor.

The first processor maps 130 the first signal to produce a first binary signal 220, reduces 160 length of the first binary signal to produce a first low dimensional signal 230, and encrypts 270 the first low dimensional signal with the public key 150 to produce a first encrypted signal 240. The first encrypted signal is an input to the determining step 170.

Similarly, the second processor maps 130 the second signal to produce a second binary signal 225, reduces 160 dimension of the second binary signal to produce a second low dimensional signal 235, and encrypts 275 the second low dimensional signal with the key 150 to produce a second encrypted signal 245. The second encrypted signal is an input to the determining step 170.

Private Image Querying

Figure 3:
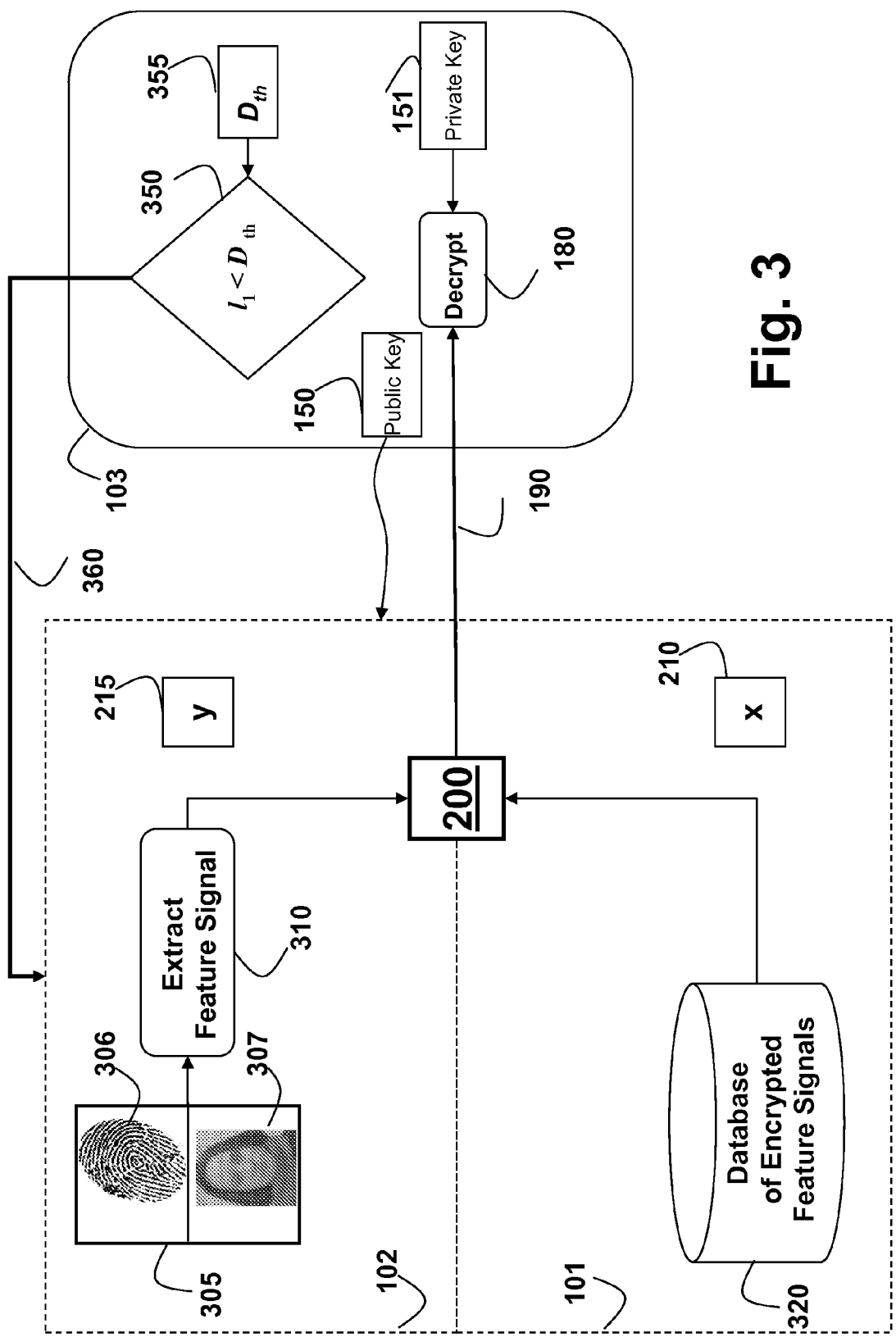
FIG. 3 is schematic of a method for secure difference calculation for biometric authentication or private multimedia querying according to an embodiment of the invention.

FIG. 3 shows a method for private querying of image data 305 according to embodiments of the invention. Examples of the image data requiring private querying include biometric data, e.g., biometric feature vectors, such as fingerprints 306 and images of faces 307. The requirement is that one should be able to search for an image database using an image query while ensuring that the database does not have access to the image query, only an encrypted version of it. In one embodiment, the processors 101 and 102 interact with a third processor 103, e.g., a remote authentication server. However, in another embodiment, the process executed by the processor 103 is executed by one of the processors 101 and 102.

The signal 215 is extracted 310 from the query image data 305. The remote server 103 confirms that the query for the signal 215 is successful, if the signal 215 has within a Manhattan distance of less than a threshold $D_{th}$ 355 from at least one of the signals in the database 320, e.g., the signal 210.

The processors 101 and 102 execute the method 200 with input signals 215 and 210 to determine the encrypted Manhattan distance $l_1$ between the signals. The public key 150 is provided by the third processor 103. The encrypted difference 190 is transmitted to the third processor. After decrypting 180 with a private key 151, the difference is compared 350 with the threshold 355. After the comparison, a confirmation (or not) is transmitted 360 to the processor 102.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining securely a Manhattan distance between a first signal and a second signal, comprising a first processor and a second processor for performing steps of the method such that the first signal is kept secret from the second processor, and the second signal is kept secret from the first processor, comprising the steps:

mapping the first signal to a first binary signal;
mapping the second signal to a second binary signal, such that a squared distance between the first binary signal and the second binary signals equals the Manhattan distance between the first signal and the second signal;
reducing the first binary signal to a first low dimensional signal;
reducing the second binary signal to a second low dimensional signal, wherein a squared distance between the first low dimensional signal and the second low dimensional signals approximates the squared distance between the first binary signal and the second binary signals;
encrypting the first low dimensional signal and the second low dimensional signal with a key to produce a first encrypted low dimensional signal and a second encrypted low dimensional signal; and
determining securely the squared distance between the first encrypted low dimensional signal and the second encrypted low dimensional signal to securely determine the Manhattan distance between the first signal and the second signal.

2. The method of claim 1, wherein the mapping further comprising:
converting the first signal and the second signal according to a binary transformation function.

3. The method of claim 1, wherein the reducing further comprising:
converting the first binary signal and the second binary signal to the first low dimensional signal and the second low dimensional signal using an embedding function.

4. The method of claim 1, wherein the embedding function is defined according to a Johnson-Lindenstrauss lemma for low-distortion embeddings.

5. The method of claim 1, wherein the first low dimensional signal and the second low dimensional signal have integer values.

6. The method of claim 1, wherein the determining securely further comprising:
expressing a squared distance function as a linear combination of homomorphic components; and
determining the squared distance between the first and the second encrypted low dimensional signals based on homomorphic transformation using the linear combination of the homomorphic components.

7. The method of claim 1, wherein the Manhattan distance between the first signal and the second signal is encrypted with the key.

8. The method of claim 7, further comprising:
transmitting the Manhattan distance to a third processor; and
decrypting the Manhattan distance.

9. The method of claim 1, wherein the first signal and the second signal are biometric feature vectors.

10. The method of claim 1, further comprising:
decrypting the Manhattan distance between the first signal and the second signal to produce a decrypted Manhattan distance; and
comparing the decrypted Manhattan distance with a threshold to produce a result of comparison.

11. A method for determining securely a Manhattan distance between a first signal and a second signal, comprising a processor for performing steps of the method, comprising the steps:
mapping the first signal and the second signal to a first binary signal and a second binary signal such that squared distance between the first and the second binary signals equals the Manhattan distance between the first signal and the second signal;
encrypting the first binary signal and the second binary signal with a key to produce a first encrypted binary signal and a second encrypted binary signal; and
determining the squared distance between the first and the second encrypted binary signals to produce the Manhattan distance.

12. The method of claim 11, wherein the determining further comprising:
expressing a squared distance function as a linear combination of homomorphic components; and
determining the squared distance between the first and the second encrypted binary signals based on homomorphic transformation using the linear combination of homomorphic components.

13. The method of claim 11, further comprising:
extracting the second signal from biometric information.

14. A system for determining securely a Manhattan distance between a first signal and a second signal, comprising a first processor and a second processor for performing steps of the method such that the first signal is kept secret from the second processor, and the second signal is kept secret from the first processor, wherein a first signal is mapped to a first binary signal, and the first binary signal is further reduced in dimension and encrypted with a key producing a first encrypted low dimensional signal, further comprising:
means for mapping the second signal to a second binary signal, wherein a squared distance between the first binary signal and the second binary signals equals a Manhattan distance;
means for reducing dimensions of the second binary signal to produce a second low dimensional signal, such that a squared distance between the first low dimensional signal and the second low dimensional signals approximates the squared distance between the first binary signal and the second binary signals;
means for encrypting the second low dimensional signal with the key to produce a second encrypted low dimensional signal; and
means for determining securely the squared distance between the first encrypted low dimensional signal and the second encrypted low dimensional signal to securely determine the Manhattan distance between the first signal and the second signal.

15. The system of claim 14, wherein the determining further comprising:
means for expressing a squared distance function as a linear combination of homomorphic components; and
means for determining the squared distance between the first and the second encrypted low dimensional signals based on homomorphic transformation using the linear combination of homomorphic components.

16. The method of claim 14, wherein the first signal and the second signal are biometric feature vectors.

17. The system of 14, further comprising:
means for transmitting the Manhattan distance to a third processor; and
means for decrypting the Manhattan distance.

* * * * *